R. W. SKILLIN.
DEMOUNTABLE RIM CONSTRUCTION.
APPLICATION FILED DEC. 15, 1915.
1,208,222.
Patented Dec. 12, 1916.
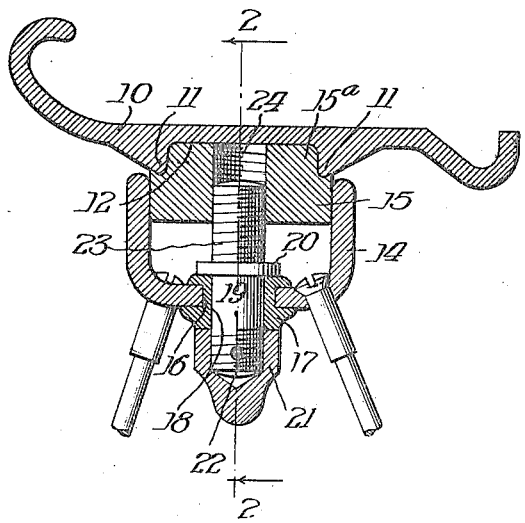
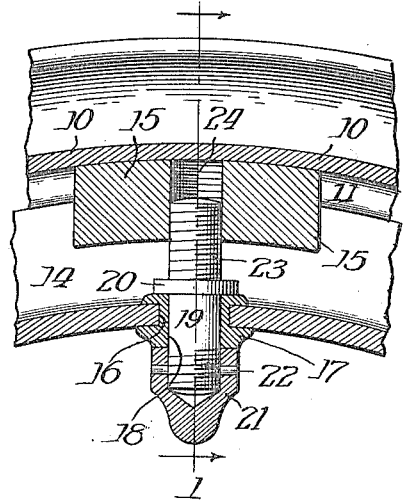
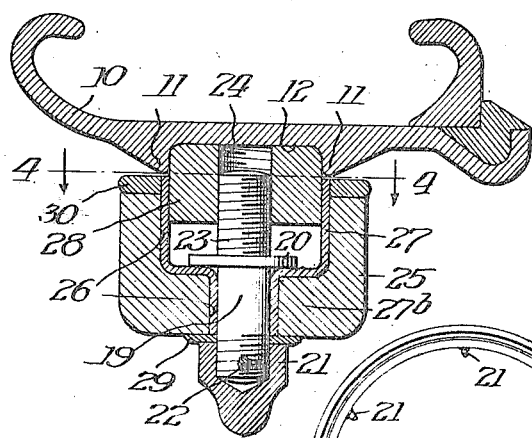
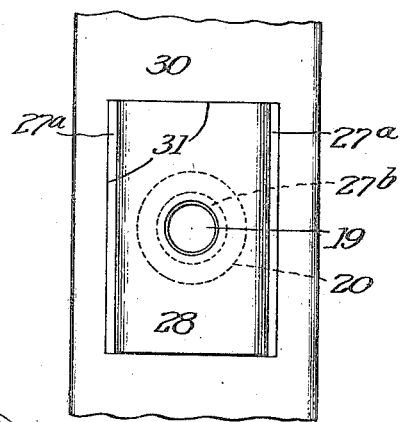

UNITED STATES PATENT OFFICE.

RALPH W. SKILLIN, OF OAK PARK, ILLINOIS.

DEMOUNTABLE-RIM CONSTRUCTION.

1,208,222.  Specification of Letters Patent.  Patented Dec. 12, 1916.

Application filed December 15, 1915. Serial No. 67,075.

*To all whom it may concern:*

Be it known that I, RALPH W. SKILLIN, a citizen of the United States, and resident of the village of Oak Park, in the county of Cook and State of Illinois, have invented certain new and useful Improvements in Demountable-Rim Construction, of which the following is a specification.

My invention relates to demountable rim construction in the art of vehicle wheels. Its principal object is the provision of strong, simple and economical means for securing a tire rim readily removably upon a wheel rim. Numerous specific objects and advantages of the present construction will appear hereinafter. The general advantages of ready removability of such rims are too well understood at the present time to require mention.

In the accompanying drawings, which form a part of this specification, I have illustrated a preferred and modified form of these improvements, Figure 1 being a transverse section of the preferred form, as on the line 1—1 of Fig. 2; Fig. 2 being a fragmentary longitudinal section on the line 2—2 of Fig. 1, the bolt-like element in each figure being shown in full lines. The modified form is shown in Figs. 3 and 4, Fig. 3 being a section similar to that of Fig. 1, and Fig. 4 being a fragmentary top view on the line 4—4 of Fig. 3; Fig. 5 is a side view, on a reduced scale, of the complete combined wheel rim and tire rim structure illustrated in Figs. 1 and 2, the tire rim being held in place by six of the specific holding means illustrated in Figs. 1 and 2.

In the several figures the tire rim 10 is of a well known construction and requires no detailed description. It is pointed out, however, that on the inner side thereof, thereby meaning toward the center of the wheel, two annular projections 11 are formed providing a channel 12 between them. Regardless of the general character of the tire-holding elements of such rims (in the present instance illustrated as clenchers) it is a fact that various kinds of tire rims and of many different manufactures are provided with projections as 11 and a channel as 12, and a distinct advantage of the present improvements resides in the applicability of a large variety of tire rims of various manufactures to a wheel having these improvements thereon.

In the preferred construction the fixed rim 14 is a metallic channel substantially U-shaped in cross section, the inner walls defining the channel or recess being substantially on parallel planes, at least through such an extent thereof as will provide for the inward and outward sliding therebetween of the locking element 15. The locking part 15 is preferably in the form of a one-piece metallic block, the sides of which contact the inner side walls of the rim 14. The outer portion 15ª of the locking element 15 is preferably made to conform to the shape of the channel 12 and substantially interfits therein when the parts are operatively together. A hole 16 is punched or drilled through the inner wall of the wheel rim 14, and in this hole is preferably secured a bearing piece 17, as by crimping or riveting the same firmly upon the metal around the hole 16. This bearing piece 17 is apertured with the hole 18 substantially radially, that is, directly toward the center of the wheel, the piece 17 constituting a bearing in which the bolt-like element 19 may rotate. The collar 20 and the square or hexagonal head 21 are secured rigidly upon the bolt-like member 19, the collar preferably being integral therewith and the head 21 being preferably threaded upon the member 19 and secured against relative rotation therewith by the through pin 22, this construction providing for easy assembling and disassembling of the parts. The collar 20 and head 21 provide shoulders which bear against inner and outer faces of the bearing piece 17, and thus hold the bolt-like element 19 against movement in its axial direction, that is, inward or outward with respect to the center of the wheel, and provide for it a constant bearing in the wheel rim 14. The inner portion 23 of the element 19 is exteriorly threaded, and the locking element 15 has the substantially radial aperture 24 threaded to interfit with the threaded portion 23.

From this construction it is obvious that when the bolt-like part 19 is rotated, as by means of a wrench applied to the head 21, the locking element or block 15 is moved inward and outward relative to the channel 14 according to the direction of rotation; and it is also clear, therefore, that when the rim, as 10, is concentrically arranged operatively with the rim 14, and the bolt-like part 19 is rotated so as to move the locking element 15 outward, the part 15ª thereof will enter the channel 12 and thus the two rims will be held securely together. Ordinarily a plurality, for instance six, of these locking mechanisms, as illustrated in Fig. 5, are employed, and the tire rim is thus equably maintained upon the wheel. It is also clear that when the locking element 15 is retracted from its holding position the tire rim is released and may be moved sidewise off and away from the fixed rim.

In the modification of Figs. 3 and 4 I show the adaptation of the invention to a wooden wheel felly, as 25, which felly is preferably provided with a recess and substantially radial aperture, as 26, within which is placed the metallic lining or wear part 27, preferably a stamping, having side walls 27ª and a tubular substantially radial bearing part 27ᵇ. The bolt-like part 19 and its connected parts are the same as in Fig. 1, and the locking element or block 28 is similarly apertured and threaded to accommodate the threaded end 23 of the rotatable element 19. A washer 29 is preferably placed under the head 21 to take the wear and pressure thereof. The felly band 30 is formed with an opening, as 31, to accommodate the part 27 or to provide for the projection therethrough of the locking element, as 28. In Fig. 2 the wheel felly 25 and the metallic felly band 30 will be understood as constituting the fixed rim within the meaning of this description and the claims. The practical operation of the two forms is the same.

The device illustrated embodies a notably small number of parts, which are themselves of simple construction, and, for the most part, are safely housed within the body of the fixed rim and thus saved from harm.

Various changes from the specific structures shown may be made in details of construction and arrangement without departing from the spirit of the invention, and all such changes are contemplated by me as fall within the scope of the appended claims.

I claim:

1. In a wheel, the combination of a metallic channeled fixed rim substantially U-shaped in cross section, the interior side walls of the channel thereof being on substantially parallel planes, a block substantially the width of said channel slidably mounted between said channel walls for inward and outward movement, said block having a substantially radial threaded hole therein, a bolt-like element substantially radially arranged carried by said fixed rim and mounted thereon for axial rotation and against movement in its longitudinal directions, a portion thereof normally within said channel being threaded and adapted to thread into the threaded hole in said block, means on said bolt-like element for rotating the same, a tire rim having a pair of annular projections on the inner side thereof, a portion of said block being adapted substantially to interfit between said projections when said tire rim is on said fixed rim and said bolt-like element is rotated to move said block outward.

2. In a wheel, the combination of a metallic fixed rim having an annular channel formed therein, the side walls defining said channel being on substantially parallel planes, a block-like locking element substantially the width of said channel and slidably positioned therein for outward and inward movement, a tire rim adapted substantially to fit upon said fixed rim, said tire rim having a pair of spaced apart projections on the inner side thereof, a portion of said block-like element being adapted substantially to interfit between said projections when the two rims are normally assembled and said block-like element is moved outwardly, and means including a threaded shaft substantially radially arranged and having a fixed bearing in said fixed rim for moving said block-like element outward and inward, said shaft being threaded into said block-like element.

3. In a wheel, the combination of a fixed rim, a tire rim having a pair of annular spaced apart projections on the inner side thereof forming a channel, a locking member having a substantially radial threaded hole mounted slidably for inward and outward movement in said fixed rim, a portion of said locking member being adapted to enter said tire rim channel lockingly when said two rims are operatively together and said locking member is moved outward, and means for moving said locking member outward into such locking position and inward into unlocking position, said means comprising a substantially radially arranged element rotatably mounted and having a constant bearing in a portion of said fixed rim, said rotatable element being thus held against outward or inward movement, said rotatable element being threaded, said locking member being threaded whereby the threads thereof coöperate and interfit with the threads on said rotatable element, whereby when said rotatable element is rotated said locking element will be moved inward or outward.

RALPH W. SKILLIN.

Witnesses:
T. D. BUTLER,
M. M. KRIESAND.